United States Patent
Zhao et al.

(10) Patent No.: US 9,258,699 B2
(45) Date of Patent: Feb. 9, 2016

(54) METHOD FOR ROUTE TRANSMISSION BASED ON SINGLE IPV6 ADDRESS PREFIX, AND WIRELESS DEVICE

(75) Inventors: Li Zhao, Shenzhen (CN); Tao Lu, Shenzhen (CN); Jianfeng Li, Shenzhen (CN); Xiaoliang Ma, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 128 days.

(21) Appl. No.: 14/241,989

(22) PCT Filed: Feb. 17, 2012

(86) PCT No.: PCT/CN2012/071290
§ 371 (c)(1),
(2), (4) Date: Feb. 28, 2014

(87) PCT Pub. No.: WO2012/155562
PCT Pub. Date: Nov. 22, 2012

(65) Prior Publication Data
US 2014/0215087 A1 Jul. 31, 2014

(30) Foreign Application Priority Data
Oct. 14, 2011 (CN) .......................... 2011 1 0313190

(51) Int. Cl.
*H04W 8/26* (2009.01)
*H04W 80/04* (2009.01)
(Continued)

(52) U.S. Cl.
CPC ................. *H04W 8/26* (2013.01); *H04L 45/74* (2013.01); *H04L 61/2007* (2013.01);
(Continued)

(58) Field of Classification Search
CPC ............................ H04L 61/6022; H04L 69/16

USPC .......... 709/231, 245, 249, 241; 370/235, 254, 370/255
See application file for complete search history.

(56) References Cited

U.S. PATENT DOCUMENTS

| 7,327,683 | B2* | 2/2008 | Ogier ..................... H04L 1/1614 370/236 |
| 2001/0040895 | A1* | 11/2001 | Templin .................. H04L 29/06 370/466 |
| 2002/0099856 | A1* | 7/2002 | Shitama ............. H04L 29/12009 709/249 |

FOREIGN PATENT DOCUMENTS

| CN | 101984636 A | 3/2011 |
| CN | 102137170 A | 7/2011 |
| CN | 102340452 A | 2/2012 |

OTHER PUBLICATIONS

"APNIC eLearning: IPv6 Addressing and Subnetting"—APNIC Jun. 2010 https://training.apnic.net/docs/eIP602__IPv6-AaS.pdf.*
(Continued)

*Primary Examiner* — Randy Scott
(74) *Attorney, Agent, or Firm* — Ling Wu; Stephen Yang; Ling and Yang Intellectual Property

(57) ABSTRACT

The present document provides a method and wireless device for implementing route transmission based on a single IPv6 address prefix. The method includes: when a wireless device succeeds in IPv6-based dialing and obtains one 64-bit-long IPv6 address prefix from a network side, the wireless device first setting apart a 126-bit IPv6 address prefix from the prefix, and then allocating the 126-bit IPv6 address prefix to a WAN interface, allocating the 64-bit-long IPv6 address prefix to a LAN interface, and notifying a user terminal connected to the LAN interface of the IPv6 prefix of the LAN interface, so that the user terminal connected to the LAN interface generates its own IPv6 address through a stateless address autoconfiguration mechanism for communication. With the technical solutions of the present document, in an IPv4/IPv6 dual stack mode, IPv4 and IPv6 protocol stacks operate normally, and the radio resource consumption is reduced.

11 Claims, 6 Drawing Sheets

(51) Int. Cl.
*H04L 29/12* (2006.01)
*H04L 29/06* (2006.01)
*H04W 84/18* (2009.01)
*H04L 12/741* (2013.01)
*H04W 40/24* (2009.01)

(52) U.S. Cl.
CPC ........... *H04L 61/25* (2013.01); *H04L 61/6022* (2013.01); *H04L 61/6086* (2013.01); *H04L 69/16* (2013.01); *H04W 80/04* (2013.01); *H04W 84/18* (2013.01); *H04L 61/6004* (2013.01); *H04L 61/6059* (2013.01); *H04L 61/6068* (2013.01); *H04L 61/6077* (2013.01); *H04W 40/24* (2013.01)

(56) References Cited

OTHER PUBLICATIONS

IPV6 Unicast Address Assignment Considerations, T-systems Enterprise Services GmbH et al., Dec. 2008, XP015060350.
Multiple Interface Support with Proxy Mobile IPV6, draft-devarapalli-netext-multi-interface-support, Ericsson, Mar. 3, 2009. XP015060531.
International Search Report for PCT/CN2012/071290 dated May 18, 2012.

* cited by examiner

METHOD FOR ROUTE TRANSMISSION BASED ON SINGLE IPV6 ADDRESS PREFIX, AND WIRELESS DEVICE

TECHNICAL FIELD

The present document relates to the field of communication technologies, and in particular, to a method and wireless device for implementing route transmission based on a single IPv6 address prefix.

BACKGROUND OF THE RELATED ART

For devices such as wireless gateways/wireless routers which have the function of 2G/3G wireless access, they usually have at least one Wireless Wide Area Network (WWAN) interface and one Local Area Network (LAN) interface, the WWAN interface is connected to the Internet through the 2G/3G wireless technology, and the LAN interface is connected to multiple user terminals by means of a cable or WiFi, to provide 2G/3G wireless Internet access function.

For the IPv4, the wireless devices allocate the private network address specified by RFC1918 to the LAN interface and the user terminal connected thereto and allocate the legal IPv4 address allocated by the network to the WAN interface through the DHCPv4 protocol, the wireless devices implement routing of the IPv4 data message between the LAN interface and the WAN interface and translation between the private IPv4 address and the legal IPv4 address through route and NAT technology, thus all users at the LAN side share one legal IPv4 address to communicate with the Internet network.

For the IPv6, in the 3GPP TS 23.060 technical specification, two IPv6 address dynamic allocation modes are defined for the wireless device, i.e., a stateful address auto-configuration and a stateless address auto-configuration, and one global unicast address prefix is allocated to the wireless device with these two address auto-configuration technologies, and the prefix has a length of 64 bits. Since the maximum of the length of the global unicast address prefix is 64, the wireless devices can not further divide the prefix into two or more prefixes, and in addition, the IPv6 has abandoned the Network Address Translation (NAT) technology, which means that the wireless devices can only allocate the prefix to WAN and LAN interfaces for sharing, and in that case, the WAN and LAN interfaces of the wireless device belong to the same segment, and operate in a bridge mode.

For the IPv4, the WAN and LAN interfaces of the wireless device belong to different segments, and the wireless device operates in a route mode; and for the IPv6, the WAN and LAN interfaces of the wireless device belong to the same segment, and the wireless device operates in a bridge mode. For the IPv4 or IPv6 single stack, the wireless devices can operate normally, but in the IPv4/IPv6 double stack mode, the IPv4 and IPv6 protocol stacks can not operate normally, because the wireless devices can not operate in the route mode and the bridge mode at the same time. In addition, when the wireless devices operate in the bridge mode, a broadcast storm will be generated easily, consuming precious radio wireless resources.

In conclusion, under the condition of the prior art, the wireless device using a single 64-bit-long IPv6 address prefix can not operate in the route mode, i.e., configuring the LAN and WAN interfaces in different segments.

SUMMARY OF THE INVENTION

The purpose of the present document is to provide a method and wireless device for implementing route transmission based on a single IPv6 address prefix.

In order to implement the above purpose, the present document provides a method for implementing route transmission of a wireless device based on a single IPv6 address prefix, comprising: when a wireless device succeeds in IPv6-based dialing and obtains a 64-bit-long IPv6 address prefix from a network side, the wireless device first setting apart a 126-bit IPv6 address prefix from the prefix, and then allocating the 126-bit IPv6 address prefix to a WAN interface, allocating the 64-bit-long IPv6 address prefix to a LAN interface, and notifying a user terminal connected to the LAN interface of the IPv6 prefix of the LAN interface, so that the user terminal connected to the LAN interface generates its own IPv6 address through a stateless address auto-configuration mechanism for communication.

Further, in order to prevent a condition that a host address in the 64-bit-long IPv6 address prefix segment of the LAN interface is the same as the address in the 126-bit-long IPv6 address prefix segment of the WAN interface of the wireless device from occurring, the wireless device starts address collision detection.

Further, a process of the address collision detection comprises the following steps:

in step one, when the wireless device receives a Neighbor Solicitation (NS) message transmitted by a host connected to the LAN interface from the LAN interface, whether a source address of the NS message is an unspecified address is firstly determined, if yes, the message is repeat address detection message, and it is to proceed to step two, if not, the collision detection process ends;

in step two, the NS message includes an IPv6 address to be detected, the wireless device determines whether the IPv6 address belongs to any of host addresses contained in the 126-bit IPv6 address prefix subnet, if yes, one NA message is transmitted to the source host, to notify the source host that the IPv6 address has been used; otherwise, the collision detection process ends.

Further, in order to prevent a condition that a host address in the 64-bit-long IPv6 address prefix segment of the LAN interface is the same as the address in the 126-bit-long IPv6 address prefix segment of the WAN interface of the wireless device from occurring, the wireless device starts 126-bit IPv6 address prefix subnet ID optimization strategy.

Further, the optimization strategy specifically is that, in the 126-bit IPv6 address prefix, the $71^{st}$ bit is set to 1, the $89^{th}$~$104^{th}$ bits have any value other than 0xFFFE, other $65^{th}$-$70^{th}$, $72^{th}$~$88^{th}$ and $105^{th}$~$126^{th}$ bits have any value.

Further, the optimization strategy specifically is that, in the 126-bit IPv6 address prefix, the $71^{st}$ bit is set to 1, the $65^{th}$~$70^{th}$ and $73^{th}$~$88^{th}$ bits are for a vendor ID in the Ethernet address of the LAN interface, and other $89^{th}$~$126^{th}$ bits have any value.

Further, when the wireless device receives one IPv6 data package from the LAN interface, the processing and forwarding are performed by means of:

the wireless device first determining whether a destination IPv6 address of the data package is a local address, if yes, forwarding the data package to an upper layer application program of the wireless device for processing;

otherwise, the wireless device determining whether the destination IPv6 address of the data package is an address which does not belong to the 126-bit IPv6 address prefix segment but belongs to the 64-bit IPv6 address prefix segment, if yes, discarding the data package, and transmitting redirection message to the source host, to notify the source host that the destination host is a neighbor; and if not, forwarding the data package to the WAN interface.

Further, when the wireless device receives one IPv6 data package from the WAN interface, the processing and forwarding are performed by means of:

the wireless device first determining whether a destination IPv6 address of the data package is a local address, if yes, forwarding the data package to an upper layer application program of the wireless device for processing;

otherwise, the wireless device determining whether the destination IPv6 address of the data package is an address which belongs to the Perfix/126 segment, if yes, discarding the data package, and transmitting redirection message to the source host, to notify the source host that the destination host is a neighbor; and if not, forwarding the data package to the LAN interface.

The present document further provides a wireless device for implementing route transmission of the wireless device based on a single IPv6 address prefix, comprising: an interface module, a prefix configuration module, and a data forwarding module, wherein, the interface module includes at least one WAN interface and one LAN interface, the WAN interface can be connected to the Internet through the 2G/3G wireless technology, and the LAN interface is connected to a user terminal by means of a cable or Wifi;

the prefix configuration module sets apart one 126-bit IPv6 address prefix from a 64-bit IPv6 address prefix obtained from the network side, then allocates the 126-bit IPv6 address prefix to a WAN interface, allocates the 64-bit IPv6 address prefix to a LAN interface, and notifies a user terminal connected to the LAN interface of the IPv6 prefix of the LAN interface, so that the user terminal connected to the LAN interface generates its own IPv6 address through a stateless address auto-configuration mechanism;

the data forward module is responsible for identifying and forwarding IPv6 data packages of two subnets of 64-bit IPv6 address prefix and 126-bit IPv6 address prefix.

Further, the identifying and forwarding comprises: forwarding the data package received from the WAN interface and not transmitted to the 126-bit IPv6 address prefix segment but belonging to the 64-bit IPv6 address prefix segment to the LAN interface, and forwarding the data package received from the LAN interface and transmitted to the 126-bit IPv6 address prefix subnet or Internet interconnection segment to the WAN interface.

Further, the wireless device further comprises a collision detection module, which is responsible for a host address detection in the LAN interface, to ensure that the condition that the host address in the 64-bit IPv6 address prefix segment of the LAN interface of the wireless device is the same as the address in the 126-bit IPv6 address prefix segment of the WAN interface of the wireless device will not occur.

In conclusion, the present document has the following beneficial effect:

with the technical solutions of the present document, in an IPv4/IPv6 dual stack mode, IPv4 and IPv6 protocol stacks operate normally, and the radio resource consumption is reduced.

PREFERRED EMBODIMENTS OF THE INVENTION

Figure 1:
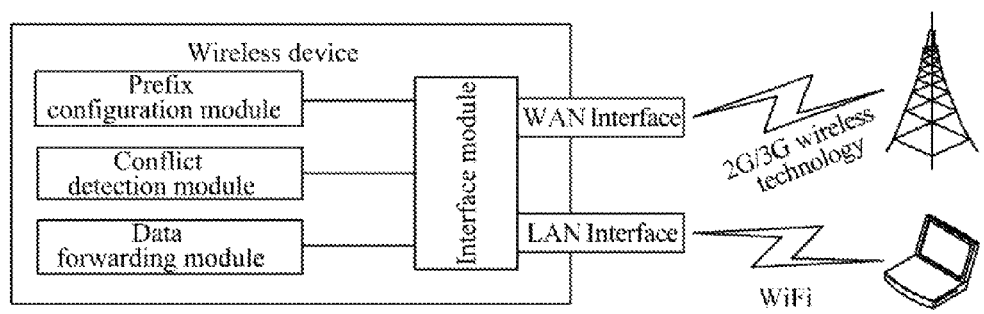
FIG. 1 is a structural diagram of a wireless device according to an embodiment of the present document.

The present document provides a method and wireless device for implementing route transmission of the wireless device based on a single IPv6 address prefix.

The wireless device comprises:

an interface module, which comprises at least one WAN interface and one LAN interface, wherein the WAN interface is able to be connected to the Internet through the 2G/3G wireless technology, and the LAN interface is connected to multiple user terminals by means of a cable or Wifi, to provide 2G/3G wireless network access function;

a prefix configuration module, which is responsible for setting apart a 126-bit IPv6 address prefix (Perfix/126) from the 64-bit global unicast address prefix (Prefix/64) obtained from the network side, and then allocating the Perfix/126 prefix to a WAN interface, allocating the Prefix/64 prefix to a LAN interface, and notifying a user terminal connected to the LAN interface of the IPv6 prefix of the LAN interface, so that the user terminal connected to the LAN interface generates its own IPv6 address through a stateless address auto-configuration mechanism;

a collision detection module, which is responsible for a host address detection in the LAN interface, to ensure that the condition that the host address in the Perfix/64 segment of the LAN interface of the wireless device is the same as the address in the Perfix/126 segment of the WAN interface of the wireless device will not occur;

a data forwarding module, which is responsible for identifying and forwarding IPv6 data packages of two subnets of Prefix/64 and Perfix/126, i.e., forwarding the data package received from the WAN interface and not transmitted to the Perfix/126 segment but belonging to the Prefix/64 segment to the LAN interface, and forwarding the data package received from the LAN interface and transmitted to the Prefix/126 subnet or Internet interconnection segment to the WAN interface.

A method for implementing route transmission of a wireless device based on a single IPv6 address prefix comprises:

when a wireless device succeeds in IPv6-based dialing and obtains a 64-bit-long IPv6 address prefix (refix/64) from a network side, the wireless device first setting apart a 126-bit IPv6 address prefix (Perfix/126) from the prefix (Prefix/64), and then allocating the Perfix/126 prefix to a WAN interface, allocating the Prefix/64 prefix to a LAN interface, and then notifying a user terminal connected to the LAN interface of the IPv6 prefix of the LAN interface, so that the user terminal connected to the LAN interface generates its own IPv6 address through a stateless address auto-configuration mechanism.

In order to prevent a condition that a host address in the Perfix/64 segment of the LAN interface is the same as the address in the Perfix/126 segment of the WAN interface of the wireless device from occurring, the wireless device can start address collision detection function, of which the specific process is as follows:

1 (1) when the wireless device receives a Neighbor Solicitation (NS) message transmitted by a host connected to the LAN interface from the LAN interface, firstly determining whether a source address of the NS message is an unspecified address (all zero), if yes, the message is repeat address detection message, and it is to proceed to step (2), if not, the collision detection process ends;

(2) the NS message including an IPv6 address to be detected, the wireless device determining whether the IPv6 address belongs to any of four host addresses contained in the prefix/126 subnet, if yes, transmitting one Neighbor Advertisement (NA) message to the source host, to notify the source host that the IPv6 address has been used, and the message includes an IPv6 address and the MAC address of the LAN interface which conflict in the prefix/126 subnet; otherwise, the collision detection process ends.

In order to prevent a condition that a host address in the Perfix/64 segment of the LAN interface is the same as the address in the Perfix/126 segment of the WAN interface of the wireless device from occurring, the wireless device can start Perfix/126 subnet ID optimization function, the specific optimization strategy has two following modes, and the wireless device can select one of them.

(1) in the prefix Perfix/126, the $71^{st}$ bit is set to 1, the $89^{th}$~$104^{th}$ bits have any value other than 0xFFFE, other $65^{th}$~$70^{th}$, $72^{th}$~$88^{th}$ and $105^{th}$~$126^{th}$ bits have any value;

(2) in the prefix Perfix/126, the $71^{st}$ bit is set to 1, the $65^{th}$~$70^{th}$ and $73^{th}$~$88^{th}$ bits are for a vendor ID in the Ethernet address of the LAN interface, and other $89^{th}$~$126^{th}$ bits have any value.

When the wireless device receives one IPv6 data package from the LAN interface, the processing and forwarding are performed by means of:

(1) the wireless device first determining whether a destination IPv6 address of the data package is a local address, if yes, forwarding the data package to an upper layer application program of the wireless device for processing; otherwise, performing step (2);

(2) the wireless device determining whether the destination IPv6 address of the data package is an address which does not belong to the Perfix/126 segment but belongs to the Prefix/64 segment, if yes, discarding the data package, and transmitting redirection message to the source host, to notify the source host that the destination host is a neighbor; and if not, forwarding the data package to the WAN interface.

When the wireless device receives one IPv6 data package from the WAN interface, the processing and forwarding are performed by means of:

(1) the wireless device first determining whether a destination IPv6 address of the data package is a local address, if yes, forwarding the data package to an upper layer application program of the wireless device for processing; otherwise, performing step (2);

(2) the wireless device determining whether the destination IPv6 address of the data package is an address which belongs to the Perfix/126 segment, if yes, discarding the data package, and transmitting redirection message to the source host, to notify the source host that the destination host is a neighbor; and if not, forwarding the data package to the LAN interface.

The technical features of the present document will be described further in conjunction with specific embodiments hereinafter, the purpose of which is to better illustrate the present document, instead of limiting the protection scope of the present document.

FIG. 1 is a structural diagram of a wireless device according to an embodiment of the present document, wherein, the wireless device comprises: an interface module, a collision detection module, a prefix configuration module, and a data forwarding module.

The wireless device is connected to one Wireless Wide Area Network (WWAN) interface and one or more Local Area Network (LAN) interfaces, the WWAN interface can be connected to the Internet through the 2G/3G wireless technology; and the LAN interface is connected to multiple user terminals by means of a cable or WIFI.

The interface module comprises one Wide Area Network (WAN) interface and one or more LAN interfaces, wherein the WAN interface can be connected to the Internet through the 2G/3G wireless technology, and the LAN interface is connected to multiple user terminals by means of a cable or Wifi, to provide 2G/3G wireless network access function.

The prefix configuration module is responsible for setting apart a 126-bit IPv6 address prefix (Perfix/126) from the 64-bit global unicast address prefix (Prefix/64) obtained from the network side, and then allocating the Perfix/126 prefix to a WAN interface, allocating the Prefix/64 prefix to a LAN interface, and notifying a user terminal connected to the interface of the IPv6 prefix of the LAN interface, so that the user terminal connected to the LAN interface generates its own IPv6 address through a stateless address auto-configuration mechanism.

The collision detection module is responsible for a host address detection in the LAN interface, to ensure that the condition that the host address in the Perfix/64 segment of the LAN interface of the wireless device is the same as the host address in the Perfix/126 segment of the WAN interface of the wireless device will not occur.

The data forwarding module is responsible for identifying and forwarding IPv6 data packages of two subnets of Prefix/64 and Perfix/126, i.e., forwarding the data package received from the WAN interface and not transmitted to the Perfix/126 segment but belonging to the Prefix/64 segment to the LAN interface, and forwarding the data package received from the LAN interface and transmitted to the Prefix/126 subnet or Internet interconnection segment to the WAN interface.

The embodiment of the present document provides a method of implementing route transmission of a wireless device based on a single IPv6 address prefix, which comprises three parts: first, providing a configuration way based on a single 64-bit-long address prefix; then, providing a data forwarding way when receiving an IPv6 data package from a LAN interface; and then providing a data forwarding way when receiving an IPv6 data package from a WAN interface.

Figure 2:
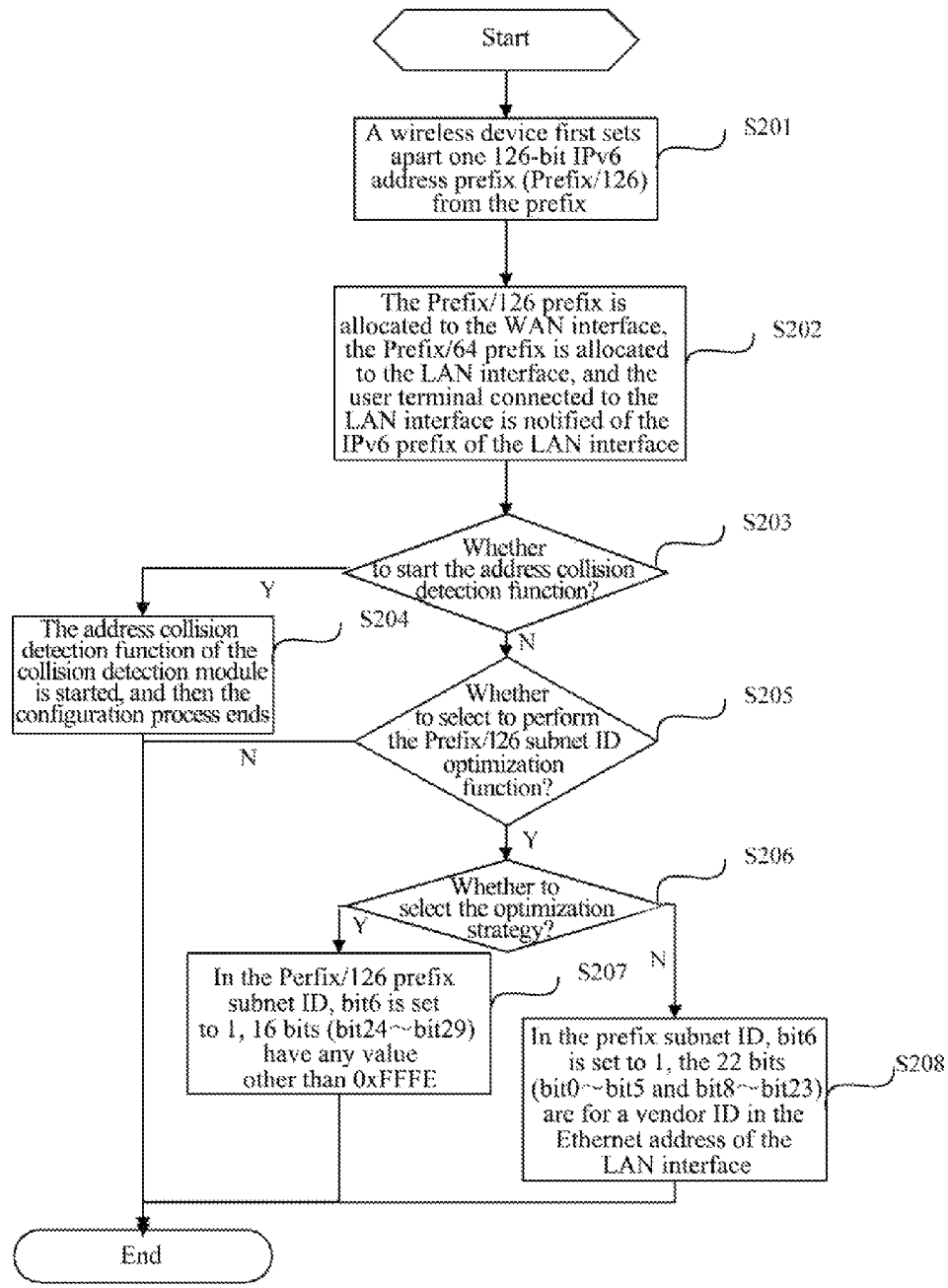
FIG. 2 is a diagram of a configuration way based on a single 64-bit-long address prefix provided by an embodiment of the present document.

FIG. 2 is a diagram of a configuration way based on a single 64-bit-long address prefix provided by an embodiment of the present document, with such a way, the LAN interface and the WAN interface can be configured to belong to different subnets, and operate in the route mode. The specific process comprises the following steps:

in step S201, when a wireless device succeeds in IPv6-based dialing and obtains a 64-bit-long IPv6 address prefix (Prefix/64) from a network side, the wireless device first seta apart a 126-bit IPv6 address prefix (Perfix/126) from the prefix (Prefix/64);

in step S202, the Perfix/126 prefix is allocated to a WAN interface, the Prefix/64 prefix is allocated to a LAN interface, and a user terminal connected to the LAN interface is notified of the IPv6 prefix of the LAN interface, so that the user terminal connected to the LAN interface generates its own IPv6 address through a stateless address auto-configuration mechanism;

in step S203, in order to prevent a condition that a host address in the Perfix/64 segment of the LAN interface is the same as the address in the Perfix/126 segment of the WAN interface of the wireless device from occurring, whether to start address collision detection function is decided, if not, it is to perform step S205; otherwise, it is to perform step S204;

in step S204, the address collision detection function of the collision detection module is started, and then the configuration process ends;

in step S205, in order to prevent a condition that a host address in the Perfix/64 segment of the LAN interface is the same as the address in the Perfix/126 segment of the WAN interface of the wireless device from occurring, whether to perform Prefix/126 subnet ID optimization function is decided, if not, the configuration process ends; otherwise, it is to perform step S206;

in step S206, if optimization strategy 1 is selected, it is to perform step S207; otherwise, it is to perform S208;

in step S207, in the Perfix/126 prefix subnet ID, bit6 is set to 1, 16 bits (bit24 bit29) have any value other than 0×FFFE, other bits (bit0 bit5, bit7 bit23 and bit30 bit61) have any value, and if the Prefix/126 prefix subnet ID is set, the configuration process ends; in step S208, in the prefix subnet ID, bit6 is set to 1, the 22 bits (bit0~bit5 and bit8~bit23) are for a vendor ID in the Ethernet address of the LAN interface, and other bits (bit7 and bit24~bit61) have any value.

Figure 3:
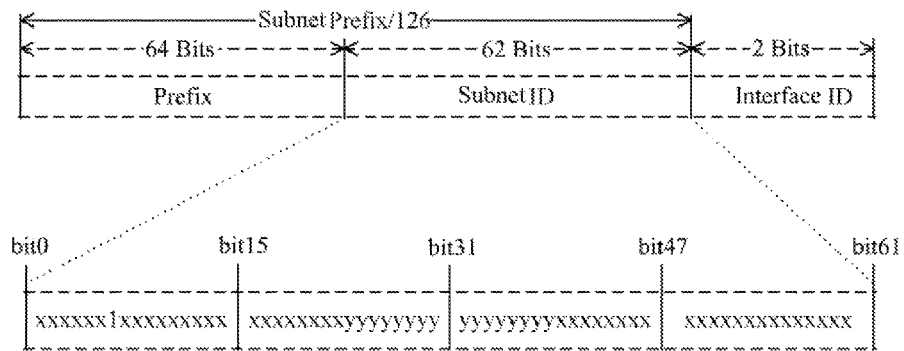
FIG. 3 is a diagram of planning a Prefix/126 Subnet ID using optimization strategy 1 provided by an embodiment of the present document.

FIG. 3 is a diagram of planning Prefix/126 subnet ID using optimization strategy 1 provided by an embodiment of the present document, wherein, Prefix/126 is comprised of two parts, i.e., Prefix and Subnet ID, Prefix is a 64-bit-long IPv6 address prefix (Prefix/64) obtained from a network side by a wireless device, and the Subnet ID has a length of 62 bits. In the present optimization strategy, in the subnet ID, bit6 is set to 1, y bits of 16-bit have any value other than 0×FFFE, and other x bits can be of any value, to ensure that the subnet ID generated by such a way will not conflict with the host address generated by the stateless address auto-configuration mechanism in the Prefix/64 segment of the LAN interface.

Figure 4:
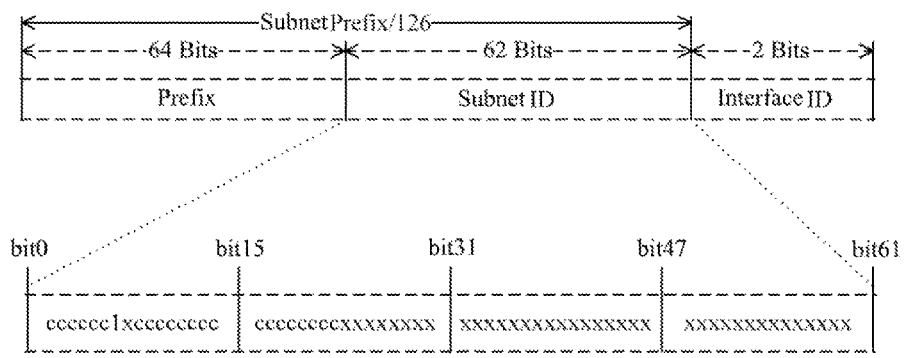
FIG. 4 is a diagram of planning a Prefix/126 Subnet ID using optimization strategy 2 provided by an embodiment of the present document.

FIG. 4 is a diagram of planning Prefix/126 subnet ID using optimization strategy 2 provided by an embodiment of the present document, wherein, Prefix/126 is comprised of two parts, i.e., Prefix and Subnet ID, Prefix is a 64-bit-long IPv6 address prefix (Prefix/64) obtained from a network side by a wireless device, and the Subnet ID has a length of 62 bits. In the present optimization strategy, in the subnet ID, bit6 is set to 1, c bits of 22-bit are for a vendor ID in the Ethernet address of the LAN interface, and other x bits can be of any value, to ensure that the subnet ID generated by such a way will not conflict with the host address generated by the stateless address auto-configuration mechanism in the Prefix/64 segment of the LAN interface.

Figure 5:
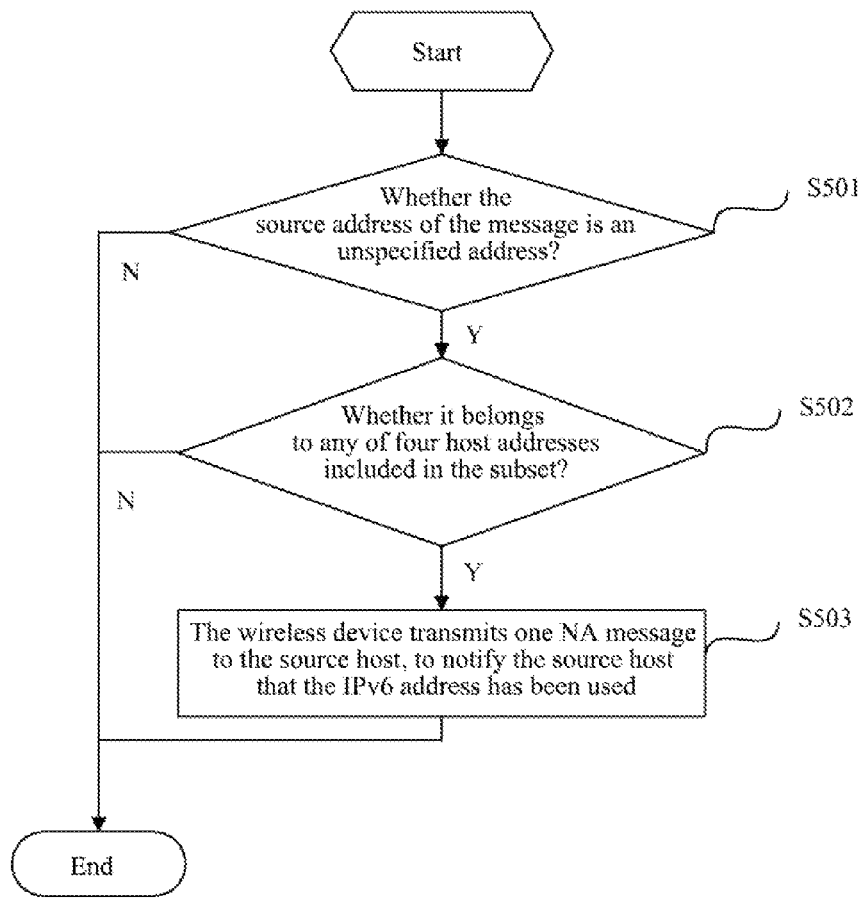
FIG. 5 is a diagram of a process of address collision detection provided by an embodiment of the present document.

FIG. 5 is a diagram of a process of address collision detection provided by an embodiment of the present document, and when the wireless device receives repeat address detection message transmitted by the host, the wireless device starts the process of address collision detection, and the specific process comprises the following steps:

in step S501, when the wireless device receives a Neighbor Solicitation (NS) message transmitted by a host connected to the LAN interface from the LAN interface, the wireless device first determines whether a source address of the NS message is an unspecified address (all zero), if yes, the message is the repeat address detection message, and it is to proceed to step S502, if not, the collision detection process ends;

in step S502, the wireless device detects whether the IPv6 address to be detected in the NS message belongs to any of four host addresses included in the prefix/126 subnet, if yes, it is to perform step S503, if not, the collision detection process ends;

in step S503, the wireless device transmits one Neighbor Advertisement (NA) message to the source host, to notify the source host that the IPv6 address has been used, and the message includes IPv6 address and the MAC address of the LAN interface which conflict in the prefix/126 subnet.

Figure 6:
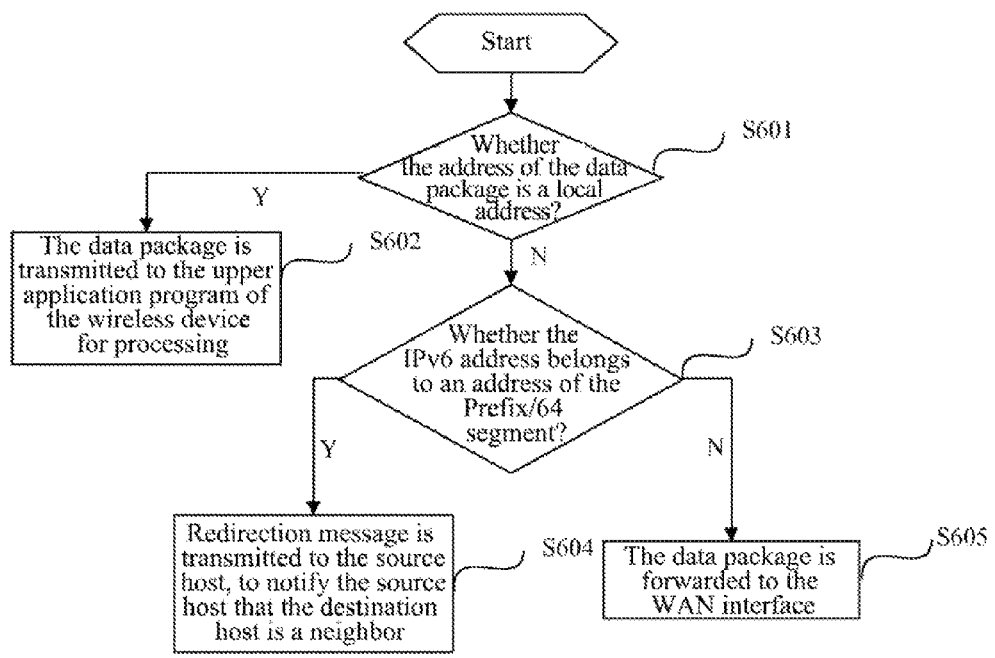
FIG. 6 is a diagram of data forwarding when a wireless device receives one IPv6 data package from a LAN interface provided by an embodiment of the present document.

FIG. 6 is a diagram of data forwarding when a wireless device receives one IPv6 data package from a LAN interface provided by an embodiment of the present document, and the specific process comprises the following steps:

in step S601, when the wireless device receives one IPv6 data package from the LAN interface, the wireless device first determines whether a destination IPv6 address of the data package is a local address, if yes, it is to perform step S602; otherwise, it is to perform S603;

in step S602, the data package is forwarded to an upper layer application program of the wireless device for processing, and then the process ends;

in step S603, the wireless device determines whether the destination IPv6 address of the data package is an address which does not belong to the Perfix/126 segment but belongs to the Prefix/64 segment, if yes, it is to perform step S604, otherwise, it is to perform step S605;

in step S604, the data package is discarded, and redirection message is transmitted to the source host, to notify the source host that the destination host is a neighbor, and then the process ends;

in step S605, the data package is forwarded to the WAN interface, and then the process ends.

Figure 7:
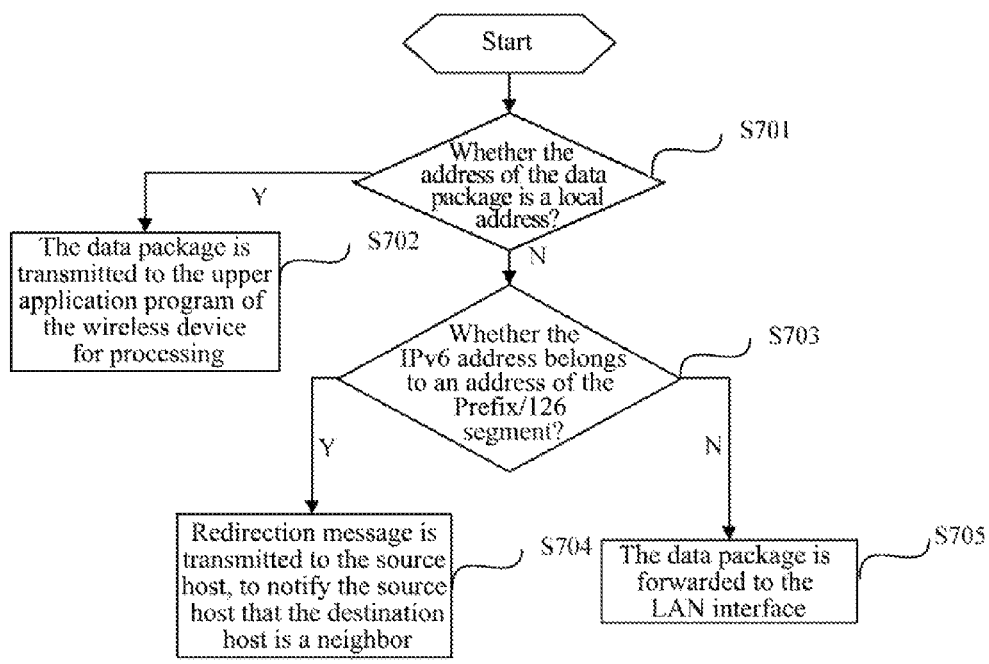
FIG. 7 is a diagram of data processing and forwarding when a wireless device receives one IPv6 data package from a WAN interface provided by an embodiment of the present document.

FIG. 7 is a diagram of data processing and forwarding when a wireless device receives one IPv6 data package from a WAN interface provided by an embodiment of the present document, and the specific process comprises the following steps:

in step S701, when the wireless device receives one IPv6 data package from the LAN interface, the wireless device first determines whether a destination IPv6 address of the data package is a local address, if yes, it is to perform step S702; otherwise, it is to perform S703;

in step S702, the data package is forwarded to an upper layer application program of the wireless device for processing, and then the process ends;

in step S703, the wireless device determines whether the destination IPv6 address of the data package is an address which belongs to the Perfix/126 segment, if yes, it is to perform step S704, otherwise, it is to perform step S705;

in step S704, the data package is discarded, and redirection message is transmitted to the source host, to notify the source host that the destination host is a neighbor, and the process ends;

in step S705, the data package is forwarded to the LAN interface, and then the process ends.

Of course, the present document can have various implementation modes, and those skilled in the art can make various corresponding changes or variations according to the present document without departing from the spirit and substance thereof of the present document. Any of modification, equivalent and improvement etc., which is made within the spirit and principle of the present document, should be contained within the protection scope of the present document.

What is claimed is:

1. A method for implementing route transmission of a wireless device based on a single IPv6 address prefix, comprising: when a wireless device succeeds in IPv6-based dialing and obtains a 64-bit-long IPv6 address prefix from a network side, the wireless device first setting apart a 126-bit IPv6 address prefix from the prefix, and then allocating the 126-bit IPv6 address prefix to a wireless Wide Area Network (WAN) interface, allocating the 64-bit-long IPv6 address prefix to a Local Area Network (LAN) interface, and notifying a user terminal which is connected to the LAN interface of the IPv6 prefix of the LAN interface, so that the user terminal connected to the LAN interface generates an IPv6 address of itself through a stateless address auto-configuration mechanism for communication.

2. The method according to claim 1, wherein, in order to prevent a condition that a host address in the 64-bit-long IPv6 address prefix segment of the LAN interface is the same as an address in the 126-bit-long IPv6 address prefix segment of the WAN interface of the wireless device from occurring, the wireless device starts an address collision detection.

3. The method according to claim 2, wherein, a process of the address collision detection comprises the following steps,
in step one, when the wireless device receives a Neighbor Solicitation (NS) message transmitted by a host connected to the LAN interface from the LAN interface, whether a source address of the NS message is an unspecified address is first determined, if yes, the message is a repeat detection address, and it is to proceed to step two, if not, the collision detection process ends;
in step two, the NS message contains an IPv6 address to be detected, the wireless device determines whether the IPv6 address belongs to any of host addresses contained in the 126-bit IPv6 address prefix subnet, if yes, one Neighbor Advertisement (NA) message is transmitted to a source host, to notify the source host that the IPv6 address has been used; otherwise, the collision detection process ends.

4. The method according to claim 1, wherein, in order to prevent a condition that a host address in the 64-bit-long IPv6 address prefix segment of the LAN interface is the same as an address in the 126-bit-long IPv6 address prefix segment of the WAN interface of the wireless device from occurring, the wireless device starts a 126-bit IPv6 address prefix subnet ID optimization strategy.

5. The method according to claim 4, wherein, the optimization strategy specifically is that, in the 126-bit IPv6 address prefix, a $71^{st}$ bit is set to 1, $89^{th}$~$104^{th}$ bits have any value other than 0xFFFE, other $65^{th}$~$70^{th}$, $72^{th}$~$88^{th}$ and $105^{th}$~$126^{th}$ bits have any value.

6. The method according to claim 4, wherein, the optimization strategy specifically is that, in the 126-bit IPv6 address prefix, the $71^{st}$ bit is set to 1, $65^{th}$~$70^{th}$ and $73^{th}$~$88^{th}$ bits are for a vendor ID in an Ethernet address of the LAN interface, and other $89^{th}18$ $126^{th}$ bits have any value.

7. The method according to claim 1, wherein, when the wireless device receives one IPv6 data package from the LAN interface, processing and forwarding are performed by means of:
the wireless device first determining whether a destination IPv6 address of the data package is a local address, if yes, forwarding the data package to an upper layer application program of the wireless device for processing;
otherwise, the wireless device determining whether the destination IPv6 address of the data package is an address which does not belong to the 126-bit IPv6 address prefix segment but belongs to the 64-bit IPv6 address prefix segment, if yes, discarding the data package, and transmitting redirection message to the source host, to notify the source host that a destination host is a neighbor; and if not, forwarding the data package to the WAN interface.

8. The method according to claim 1, wherein, when the wireless device receives one IPv6 data package from the WAN interface, processing and forwarding are performed by means of:
the wireless device first determining whether a destination IPv6 address of the data package is a local address, if yes, forwarding the data package to an upper layer application program of the wireless device for processing;
otherwise, the wireless device determining whether the destination IPv6 address of the data package is an address which belongs to the Perfix/126 segment, if yes, discarding the data package, and transmitting redirection message to the source host, to notify the source host that the destination host is a neighbor; and if not, forwarding the data package to the LAN interface.

9. A wireless device for implementing route transmission of the wireless device based on a single IPv6 address prefix, comprising: an interface module, a prefix configuration module, and a data forwarding module, wherein,
the interface module contains at least one WAN interface and one LAN interface, the WAN interface can be connected to Internet through 2G/3G wireless technology, and the LAN interface is connected to a user terminal by means of a cable or Wifi;
the prefix configuration module sets apart one 126-bit IPv6 address prefix from a 64-bit IPv6 address prefix obtained from a network side, then allocates the 126-bit IPv6 address prefix to a WAN interface, allocates the 64-bit IPv6 address prefix to a LAN interface, and notifies a user terminal which is connected to the LAN interface of the IPv6 prefix of the LAN interface, so that the user terminal connected to the LAN interface generates an IPv6 address of itself through a stateless address auto-configuration mechanism;
the data forwarding module is responsible for identifying and forwarding IPv6 data packages of two subnets of 64-bit IPv6 address prefix and 126-bit IPv6 address prefix.

10. The wireless device according to claim 9, wherein, identifying and forwarding comprises: forwarding the data package received from the WAN interface and not transmitted to the 126-bit IPv6 address prefix segment but belonging to the 64-bit IPv6 address prefix segment to the LAN interface, and forwarding the data package received from the LAN interface and transmitted to the 126-bit IPv6 address prefix subnet or Internet interconnection segment to the WAN interface.

11. The wireless device according to claim 9, wherein, the wireless device further comprises a collision detection module, which is responsible for a host address detection in the LAN interface, to ensure that a condition that the host address in the 64-bit IPv6 address prefix segment of the LAN interface of the wireless device is the same as an address in the 126-bit IPv6 address prefix segment of the WAN interface of the wireless device will not occur.

* * * * *